United States Patent [19]
Renk et al.

[11] Patent Number: 5,038,631
[45] Date of Patent: Aug. 13, 1991

[54] LUBRICANT RESTRICTING DEVICE

[75] Inventors: Richard J. Renk; George E. Boller; Richard M. Ebert, all of Winona, Minn.

[73] Assignees: Carol Ann Mackay; Helen Lou Kurtz, both of Winona, Minn.

[21] Appl. No.: 442,438

[22] Filed: Nov. 24, 1989

Related U.S. Application Data

[60] Continuation of Ser. No. 81,982, Aug. 5, 1987, abandoned, which is a division of Ser. No. 794,769, Nov. 4, 1985, abandoned.

[51] Int. Cl.⁵ .............................................. F16J 15/34
[52] U.S. Cl. .................................. 74/467; 74/606 R; 277/12; 277/56
[58] Field of Search ..................... 74/467, 468, 606 R; 227/53, 56, 67, 68, 12, 87

[56] References Cited

U.S. PATENT DOCUMENTS

| | | | |
|---|---|---|---|
| 1,400,119 | 12/1921 | Whittingham | 74/606 |
| 1,914,891 | 6/1933 | McAllister | 277/67 |
| 2,438,020 | 3/1948 | Rambo et al. | 74/606 |
| 4,104,930 | 8/1978 | Sanders | 74/609 |
| 4,347,759 | 9/1982 | Renk et al. | 74/606 R |
| 4,363,490 | 12/1982 | Kuehn | 277/56 |
| 4,384,387 | 5/1983 | Pachuta | 277/53 |
| 4,470,324 | 9/1984 | Renk et al. | 74/606 R |
| 4,565,378 | 1/1986 | Wehrfritz et al. | 277/53 |
| 4,603,865 | 8/1986 | Bien | 74/606 R |
| 4,689,511 | 8/1987 | Baker et al. | 277/68 |

Primary Examiner—Eric K. Nicholson
Attorney, Agent, or Firm—Richard J. Renk

[57] ABSTRACT

A device for restricting the flow of lubricant from a locomotive traction motor gear case and along an armature drive shaft of the traction motor and into the drive shaft's bearing mounting assembly, portions of which extend into the gear case. The device may also restrict lubricant flow into a return drain port of the drive shaft's bearing mounting assembly as a result of gear generated splash within the case.

10 Claims, 9 Drawing Sheets

LUBRICANT RESTRICTING DEVICE

This application is a continuation of application Ser. No. 07/081,982, filed Aug. 5, 1987, now abandoned, which is a division of application Ser. No. 794,769, filed Nov. 4, 1985, now abandoned.

FIELD OF THE INVENTION

The present invention relates to the restriction of lubricant flow through a shaft mounting assembly. More particularly, it relates to the restriction of gear lubricant flow into a traction motor armature shaft bearing assembly such as used in conjunction with traction motor gear cases for diesel and electric locomotives.

BACKGROUND ART

In diesel electric or electric locomotives, an electric traction motor armature or drive shaft having a pinion gear on one end thereof is coupled to a bull gear on a locomotive axle to drive a set of wheels. The gears are enclosed within a gear case comprised of a pair of matable sections which provide an enclosure for the retention of lubricant such as illustrated in U.S. Pat. Nos. 4,347,759 and 4,470,324.

While the concepts disclosed in the above noted patents have been instrumental in making a significant improvement in the retention of lubricant in traction motor gear cases, such patents dealt primarily with the reduction of lubricant losses through the axle and bull gear access openings into the gear case.

The present invention relates to another access area into the gear case, namely the armature shaft bearing assembly. The latter is unique since it is not only desirable to keep the heavy asphaltic lubricant used to lubricate the pinion and bull gears in the gear case, but also to keep the asphaltic lubricant from migrating to the traction motor armature shaft bearings where it can dilute and contaminate the armature bearing grease thereby resulting in failure of the armature bearing itself.

However, up to this time it has been difficult to keep the gear lubricant from migrating into the armature bearing assembly because of the high lubricant splash pressures generated by the large bull gear carried by the locomotive axle.

Failure to keep the gear case lubricants from migrating into the armature bearing mounting assembly can result in numerous severe problems such as failed armature bearings because of armature bearing grease dilution, high gear tooth wear because of low lubricant levels in the gear case, and of course locomotive "down-time" because of the need to replenish gear case lubricants.

SUMMARY OF THE INVENTION

In accordance with the present invention, there is provided a lubricant restricting device for use in conjunction with an armature drive shaft which extends into a gear case and has a drive gear on the end thereof. The device is generally positioned between the drive gear and the drive shaft's bearing mounting assembly so as to reduce lubricant flow along the drive shaft as a result of flow pressures and turbulence generated by the rotation of gears in the gear case.

In one embodiment of the invention, lubricant flow is restricted by a barrier which extends toward the drive gear and reduces the flow of lubricant into the space between the drive gear and its bearing mounting assembly.

As another feature of the invention, the restricting device may have a shielding section to also protect the return drain of the armature shaft mounting assembly from gear generated lubricant flow and turbulence.

PREFERRED EMBODIMENTS

In the drawings, the invention will be described with reference to a locomotive traction motor armature shaft and drive gear assembly but it is of course not limited thereto.

Figure 1:
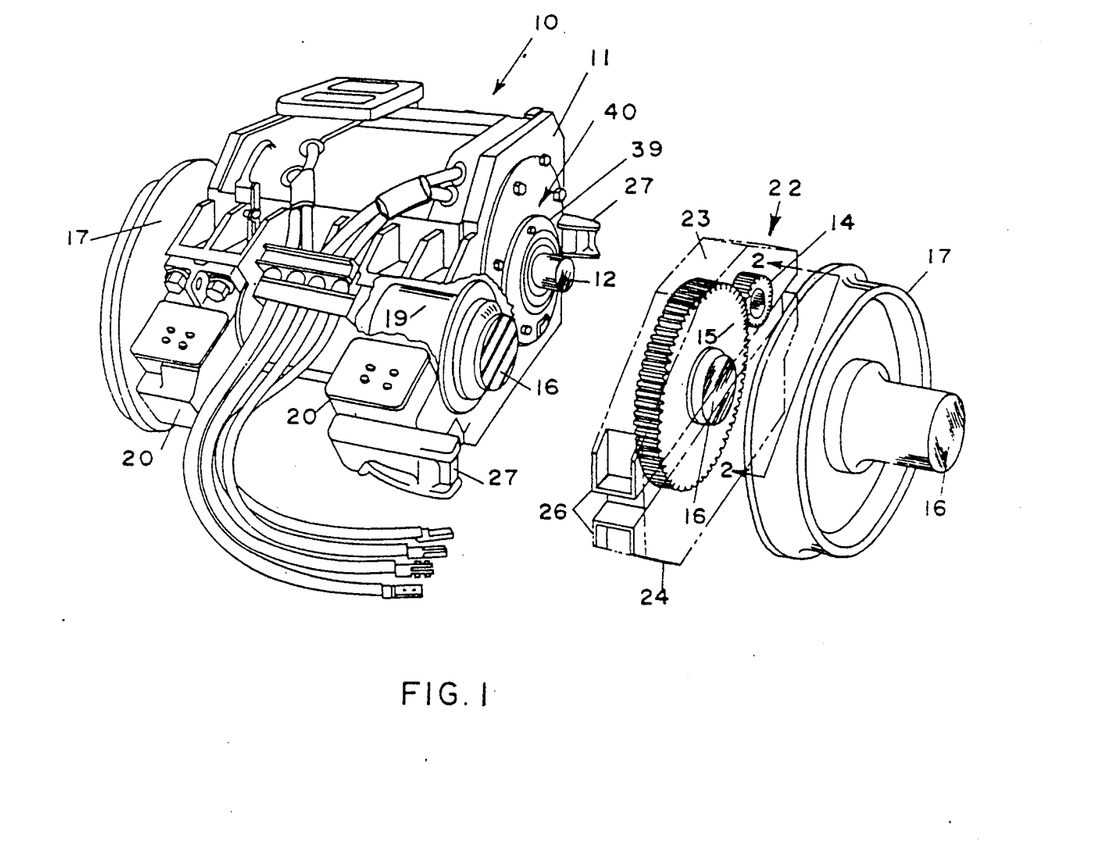
FIG. 1 is an exploded perspective view of a locomotive traction motor including its associated gear and wheel assembly and its gear case shown in phantom.

In FIG. 1 there is shown a typical electric traction motor 10 as used in a diesel electric or electric locomotive. The motor 10 has a frame 11 which houses a rotatable armature or drive shaft 12. A pinion gear 14 is mounted on the end of the armature shaft 12 and drives a bull gear 15 mounted on the locomotive axle 16 to propel the wheels 17.

In a conventional installation, the traction motor 10 is supported, in part, on the axle 16 by suspension bearings 19 clamped in place against the frame 11 by axle caps 20.

A lubricant retaining gear case 22 having a top section 23 and a lower section 24 encases the gears 14 and 15. The gear case sections 23 and 24 are somewhat similar in shape and mate at a split-line indicated at 25 (FIG. 2) to provide a unitary structure. Brackets 26 at the gear case ends are used to clamp the sections 23 and 24 in mating relationship on supporting arms 27 of the traction motor.

Figure 2:
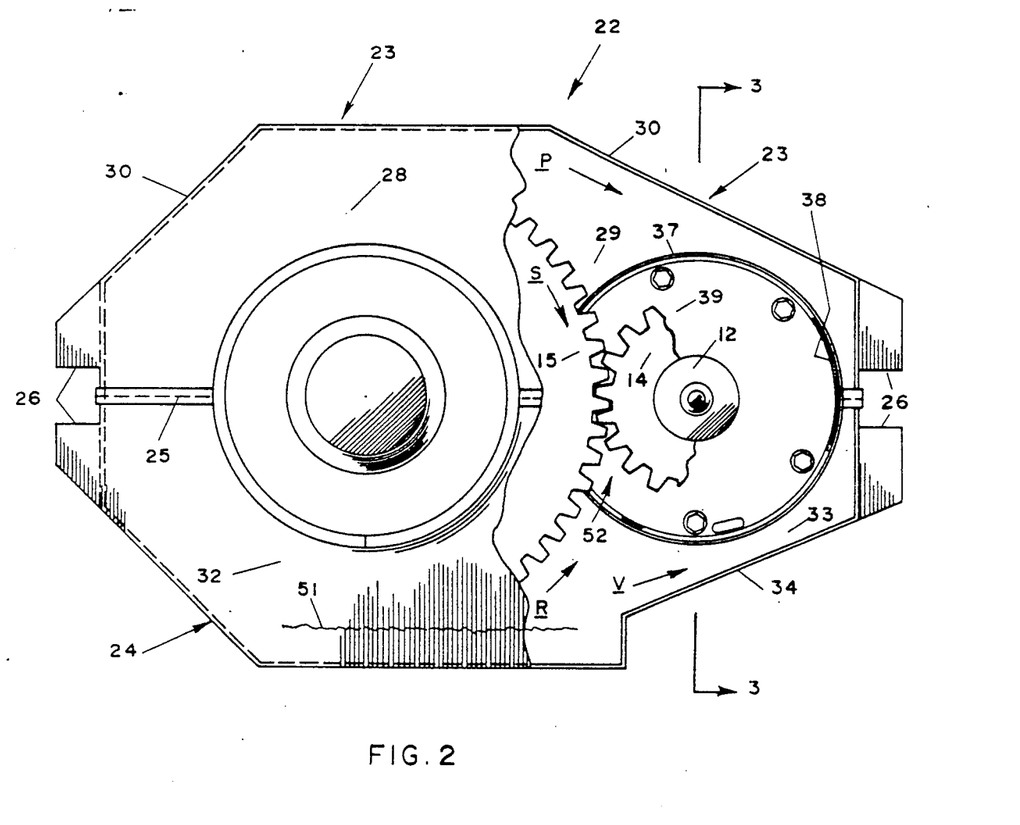
FIG. 2 is a side elevation of the gear case partially cut away as viewed somewhat along line 2—2 of FIG. 1.
Figure 3:
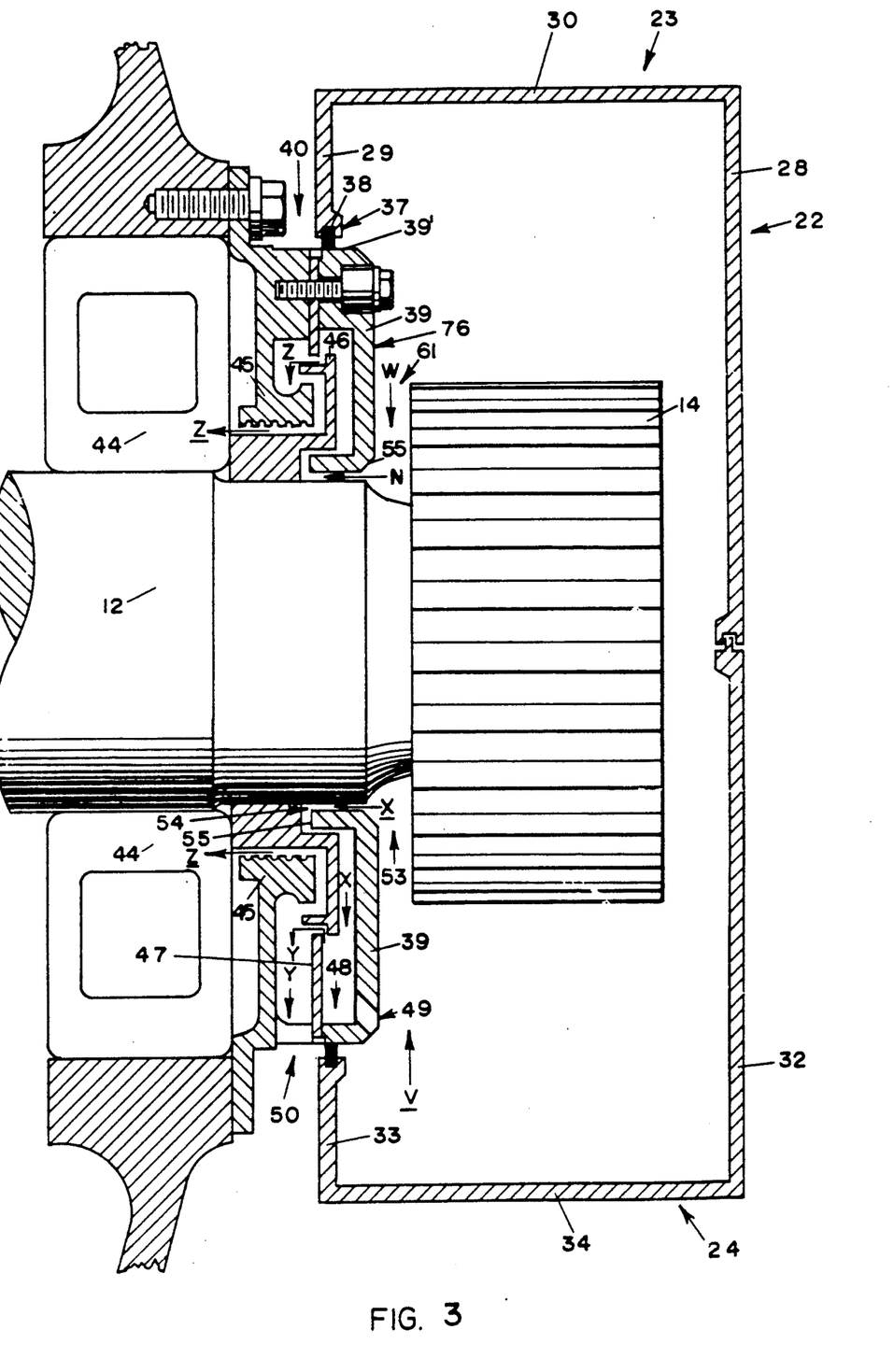
FIG. 3 is a partial sectional view of the gear case and the traction motor's armature bearing mounting assembly and driving pinion gear taken along lines 3—3 of FIG. 2.

As shown in FIGS. 2 and 3, the upper gear case section 23 includes sides 28 and 29 and a top wall 30 having a series of angularly disposed areas. The lower section 24 has somewhat similar sides 32 and 33 and a bottom 34 with several angularly disposed areas.

The gear case side wall 29 and 33 facing the traction motor (FIG. 3) is provided with a semi-circular cutout 37 or recess in both the upper and lower sections 23 and 24; these cutouts align with one another to provide a circular passage through which a portion of the armature shaft bearing mounting assembly 40 may extend to place the end of the drive shaft 12 and the pinion gear 14 to the inside of the gear case. The armature bearing mounting assembly 40 includes an exterior mounting or seal plate 39 (FIGS. 1-3) which is sealed with respect to the gear case cutout 37 by a felt seal 38 (FIG. 3) engaging the mounting plate rim 39'.

The armature shaft 12 is supported or journaled at the pinion end by a roller bearing 44. Because different lubricants are used to lubricate the roller bearing 44 and the gears 14 and 15 in the gear case 22, the armature bearing mounting assembly 40 is intended to keep the different lubricants from intermixing with one another. As shown in FIG. 3, the assembly 40, in addition to the mounting plate 39, also includes a stationary labyrinth plate 45, a flinger 46 rotatable with the armature shaft 12, and a stationary baffle ring 47.

In function, the armature seal assembly 40 is intended to prevent gear lubricant from the gear case 22 from being forced along the armature shaft in the directions X (FIG. 3) by the action of gears 14 and 15 and into the armature bearing 44 where it can cause armature bearing failure. When reaching the flinger 46, lubricant is flung by centrifugal force toward the outside of the mounting plate cavity 48, and returned to the inside of the gear case through an inner drain port 49 in the lower portion of the mounting plate 39 (FIG. 3). In the event that the gear lubricant does not flow properly because of its high viscosity, or if the centrifugal action of flinger 46 is inadequate to discharge it through the inner drain 49, it is intended that any excess gear lubricant would flow past the baffle ring 47 in the direction Y and then be discharged to atmosphere (to the track bed) through the outer or safety drain 50 located in the lower portion of the labyrinth plate 45.

However, with current locomotive service, because of the higher speeds, horsepower loads and lubricant temperatures, gear case lubricant losses through the armature seal assembly 40 have been an ever increasing problem. Not only have the losses caused a problem from the standpoint of low lubricant levels in the gear case causing overheated and burned gears (and more frequent refilling intervals), but in many instances because of higher speeds and lubricant pressures, the gear lubricant being forced in the directions N and X along the armature shaft 12 cannot exit fast enough through the drain ports 49 and 50 or these ports may be plugged. It then flows in the direction Z past the labyrinth 45 where it can enter the roller bearing 44 thereby diluting the lubricant therein causing failure.

It has been found that the gear lubricant can follow two paths in entering the armature seal assembly 40. For example, as shown in FIG. 2, when the bull gear 15 is rotating in the direction R, the gear lub is lifted from the bottom of the gear case and into the mesh with the pinion gear 14 (as indicated at 52). Meshing of the gears 14 and 15 causes gear lubricant to squirt under high pressure and be forced along the mounting plate 39 and along the back of the pinion gear 12 as shown by the arrow 53. Some of this flow then moves in direction X along the space 54 between the drive shaft 12 and the mounting plate leg 55.

At higher speeds, another source of loss has been found to occur along the area of the inner drain port 49. As bull gear 15 rotates in the direction R, gear lubricant splash indicated at V (FIG. 2) can be forced up into the port 49 and be pumped outwardly by the flinger 46. This splash and turbulence can be very severe since the bull gear may approximate 30 inches in diameter and locomotive speeds can approach 100 mph in some instances.

When the bull gear 15 rotates in the opposite direction i.e. as indicated at S in FIG. 2, gear lubricant is forced along the top side of the gear case in the direction "P". It then runs downwardly between the back of the pinion gear 14 and along the mounting plate 39 in the direction W (FIG. 3) where some is forced out between the seal plate leg 15 and out along the shaft 12 in the direction N. However, again because of the volumes and pressures involved, the gear lubricant has been found to overpower the flinger 46 and some may be lost through the outside drain 50.

Now, in accordance with the present invention, to reduce gear lubricant losses through the armature bearing mounting assembly 40, there is provided a lubricant restricting device 65 (FIG. 4-6) generally positioned between the mounting plate 39 and the back side 66 of the pinion gear 14. As shown in FIG. 5, the restricting device 65 may be molded from a resilient material, such as an elastomeric or semi-elastomer material, and may include a base indicated generally at 67 and first barrier means in the form of lip means 68. The base may be circular in shape and the lips may be in the form of spaced apart concentric circles.

Figure 4:
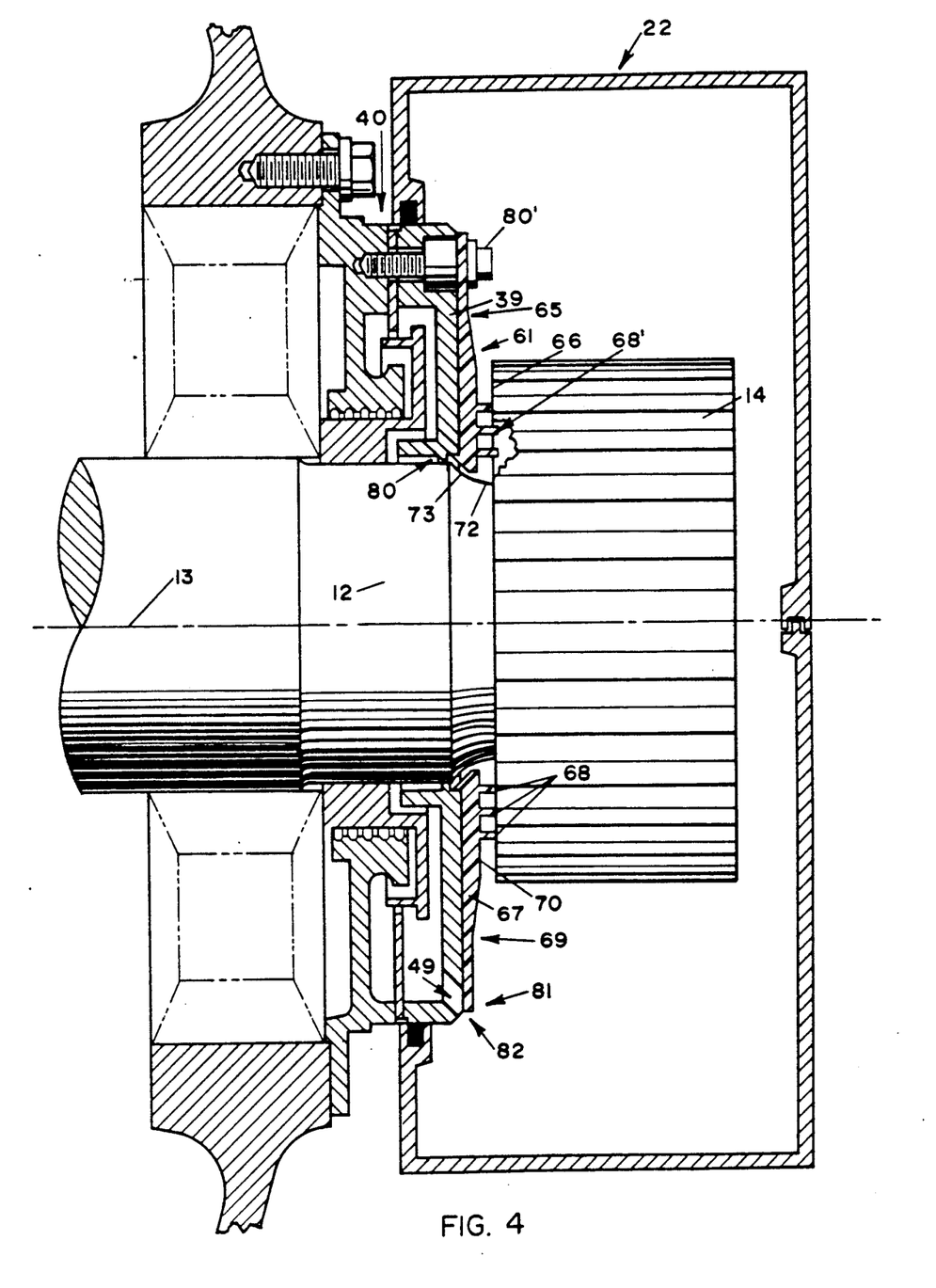
FIG. 4 is a vertical sectional view somewhat similar to FIG. 3 but including one embodiment of the lubricant restricting device of the invention mounted in place between the pinion gear and the armature bearing mounting assembly.
Figure 5:
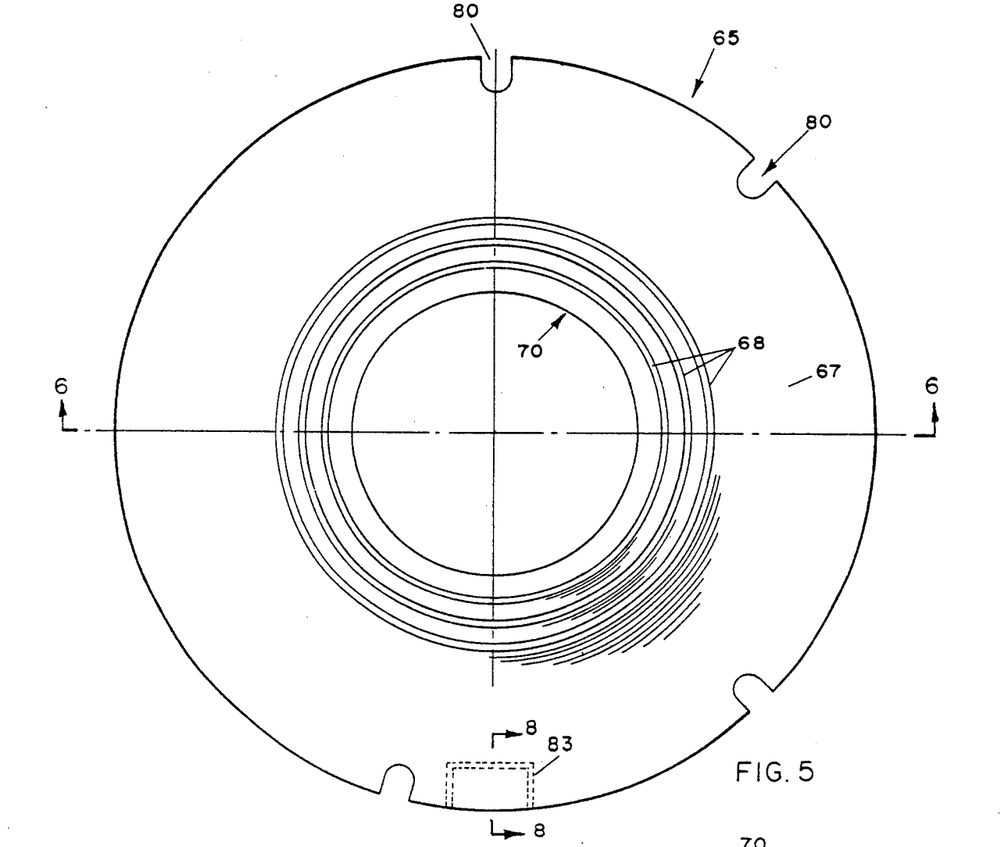
FIG. 5 is a plan view of the lubricant restricting device shown in FIG. 4.

To reduce lubricant flow in the space 61 between the pinion gear 14 and the mounting plate 39, the lips may extend so as to provide interference contact with the gear side 66 as indicated in FIG. 4 at 68' (shown in uncompressed state). As a further aid in diverting the flow of lubricant between the pinion gear 14 and the mounting plate 39, the base 67 may have a tapered area 69 leading to a slightly thicker concentric front face portion 70 as the base extends radially inwardly toward a center bore or opening 71 (FIG. 6) through which a reduced diameter extension 72 (FIG. 4) of the armature shaft 12 projects.

Figure 6:
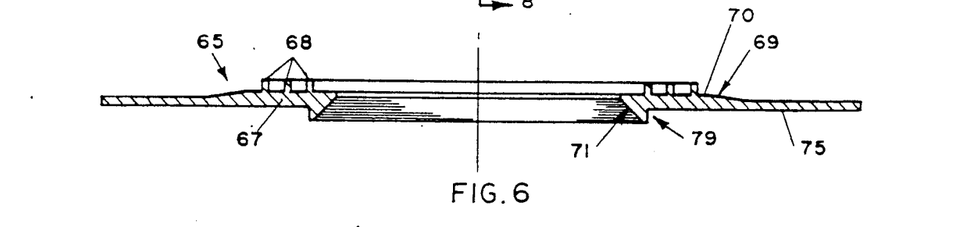
FIG. 6 is a sectional view of the lubricant restricting device as viewed along lines 6—6 of FIG. 5.

Bore 71 in base 67 tapers radially outwardly and upwardly to somewhat follow the shaft fillet 73 as it progresses from the front face 70 of the base toward the back side 75 (FIG. 6). The back side 75 of the base is generally flat so as to nest against the front side 76 (FIG. 3) of mounting plate 39. The outer wall of bore 71 provides a projection or catch 79 as it extends above or beyond the plane of the back side 75. The catch 79 nests or extends into the shaft bore 80 (FIG. 4) in mounting plate 39. In other words, the catch 79 extends under (or inwardly) of the plane of the mounting plate's face 76.

In function, the catch or ledge 79 serves to collect any lubricant which might migrate or be forced along the back side 75 of the restricting device 65, particularly from the top downwardly as a result of the lubricant splash shown at P (FIG. 2). Such lubricant can then flow circumferentially around the catch 79 to approximately the 6:00 o'clock position where it can either run behind the base 67 or be returned in the direction X (FIG. 3) to the gear case via inner drain port 49. To provide maximum resistance to lubricant flow, the clearance between the tapered bore 71 of the restricting device and the armature shaft fillet 73 should be kept as small as possible without touching or providing a rubbing effect which could score the shaft.

For purposes of mounting, the lubricant restricting device 65 may be provided with holes or slots 80 (FIG. 5) through which bolts 80' (FIG. 10) of the armature seal assembly 4 may extend to also clamp the device in place.

Figure 7:
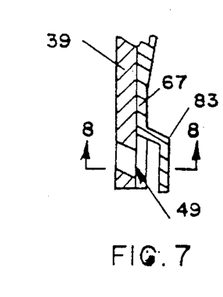
FIG. 7 is a fragmentary vertical sectional view of the lubricant restricting device taken along the area adjacent the armature bearing mounting plate's lubricant return or drain port shown an alternate embodiment for shielding the return port.
Figure 8:
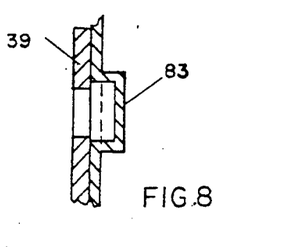
FIG. 8 is a fragmentary view taken generally along lines 8—8 of FIG. 7.

As a further feature of the invention, to reduce the aspirating and/or splash losses encountered when gear lubricant in the bottom of the gear case is sprayed in the pattern shown at V (FIGS. 2 and 3) as the bull gear 15 rotates in the direction R, the restricting device base 67 is provided with means 81 (FIG. 4) for shielding the inner drain port 49. This means may extend in front of the drain port 49 to block a portion of it from direct splash V but yet allow lubricant drainage from the drain port 49 through a narrowed channel 82. Another shielding means variation is shown in FIGS. 7 and 8 wherein a slightly raised duct or channel 83 is used which bulges away from the face of the base 67 and toward the inside of the gear case. (The location of the raised duct 83 is also shown in dotted lines on FIG. 5).

Figure 9:
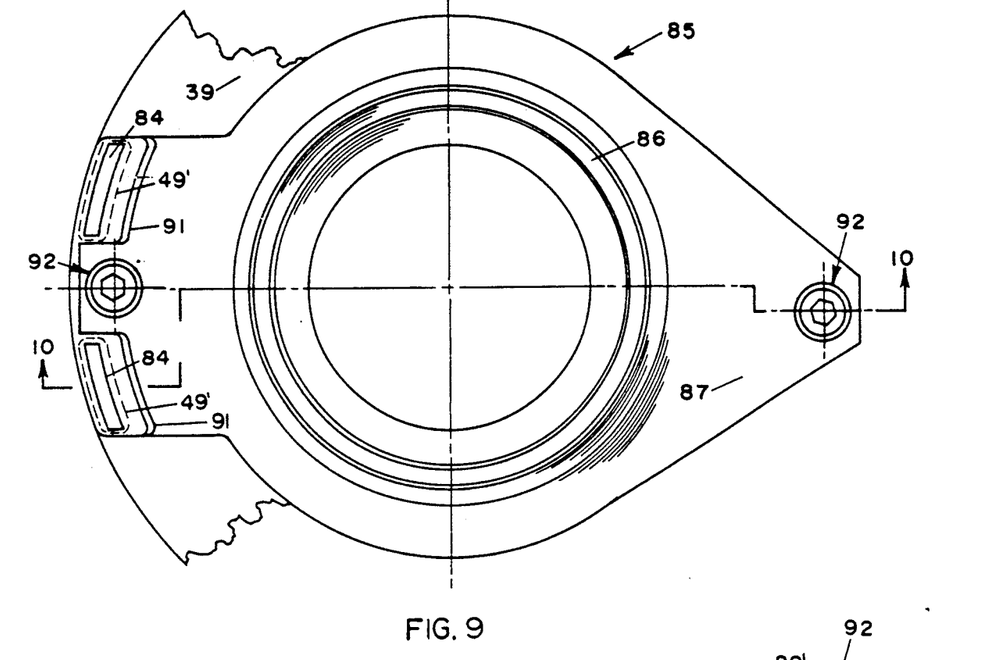
FIG. 9 is a plan view of another embodiment of the invention.
Figure 10:
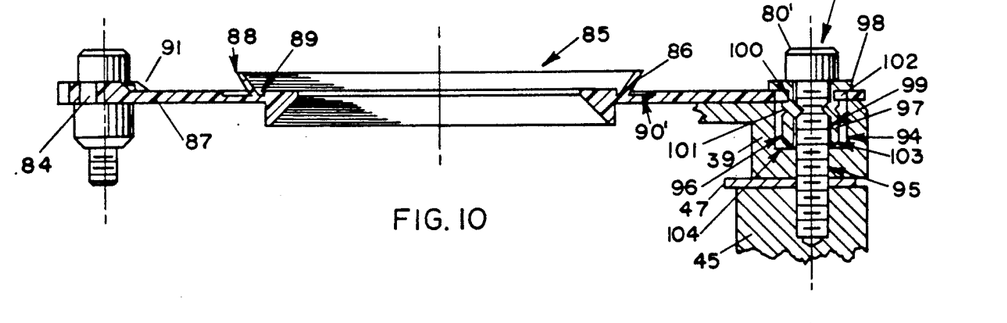
FIG. 10 is a cross sectional view taken along lines 10—10 of FIG. 9 showing a means of attaching the lubricant restricting device to the armature bearing assembly.

Another alternate embodiment of the invention is shown at 85 in FIGS. 9 and 10 wherein a single lip 86 is used in place of a series of lips as in the embodiment of FIGS. 4–6. The lip 86 differs in that it diverges radially away or outwardly from the shaft 12 as it extends from the retaining device base 87 toward the side 66 of the pinion 14. In other words, the lip tip 88 (FIG. 10) (which is adapted to engage the side 66 of the pinion gear) has a greater diameter than its connecting juncture point 89 with base 87. In effect, the outside surface of lip 86 forms a "V"-shaped trough into which lubricant can pool. The lip thus restricts lubricant flow between the gear side 66 and mounting plate 39.

To permit the lip 86 to accommodate different variations in the space 61 (FIG. 4) between the gear side 66 and mounting plate 39, the base 87 behind the lip 86 may be relieved to provide a pocket 90 into which the lip may deflect and nest. Thus, if the pinion gear 14 is advanced excessively along the armature shaft extension 72 toward the mounting plate 39, the lip 86 may fold into the pocket 90.

The embodiment of FIGS. 9 and 10 also differs from that of FIGS. 2-8, by showing the restricting device 85 installed on a mounting plate 39 having two drain ports indicated by dotted lines at 49'. These ports are arcuately displaced slightly on both sides of the bottommost bolt at the 6:00 o'clock position.

Shielding of the drain ports 49' is provided by overlaid bosses 91 in the device having narrow slots 84 which extend substantially the length of the drain ports 49 of the mounting plate 39 but are of a reduced height to restrict lubricant splash into such ports. The bosses or raised areas 91 extend away from the base 87 toward the gear to further shield direct lubricant flow toward the ports 49'.

Figure 11:
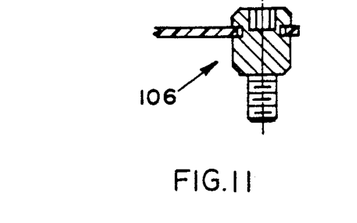
FIG. 11 is a sectional view of a modification of the means for attaching the lubricant restricting device to the armature bearing assembly.

For purposes of accommodating difference in thermal expansion and contraction between the steel of the mounting plate 39 and the non-metal material of the restricting device 85, there is provided a novel securing means 92 for attaching the restricting device (FIGS. 10 and 11).

The securing means 92 is shown fastening the restricting device 85 and the mounting plate 39 to the labyrinth plate 45. The mounting plate 39 has a counterbored hole 94 followed by a reduced diameter hole area 95.

In addition to the bolt 80', the securing means 92 includes a sleeve 96 having a shank 97, a flanged head 98, an internal bore 99 and an undercut or recessed groove 100 below and of a smaller diameter than the outside diameter of the shank 97 and flanged head 98. In use, a securing means 92 is inserted in holes 102 of the restricting device so that its base 87 is held at about the 6:00 and 12:00 o'clock positions respectively. Holes 102 may be made slightly larger than the diameter of the recessed groove 100 so that slight floating movement of the base 87 due to thermal expansion can be accommodated when the restricting device is subjected to varying operating temperatures.

Preferably the holes 102 are of smaller diameter than the outside diameter of shank 97 to in effect capture the base 87 in the groove 100 between the large diameters of the flange 98 and the shank 97. However, the width of the sleeve groove 100 in an axial direction parallel to the bolt length is slightly greater than the thickness of base 87 adjacent the bolt area so as to also allow the floating movement.

Bolt 80' is secured within the sleeve by a swaged or pinched area 101 (FIG. 10). When bolted down, the underside of the bolt head 80' bears against the bushing flange 98 to urge the lower end 103 of the shank 97 into contact with the bottom shoulder 104 of the counterbore 94. This firmly clamps the mounting plate 39 against the baffle ring 47 and labyrinth plate 45 with the proper bolt stretch while permitting the restricting device base 87 to float with thermal expansion.

The hole 102 in the base 87 at the 6:00 o'clock position in some cases might have a closer fit to the diameter of the recessed groove 100 to provide a more positive location at the 6:00 o'clock position but allowing for the thermal expansion or contraction to be accommodated with the larger clearance of the hole 102 relative to the groove 100 at the 12:00 o'clock position.

While the bolt 80' and sleeve 96 are shown as separate items, they of course can be made as an integral assembly as shown at 106 in FIG. 11.

Figure 12:
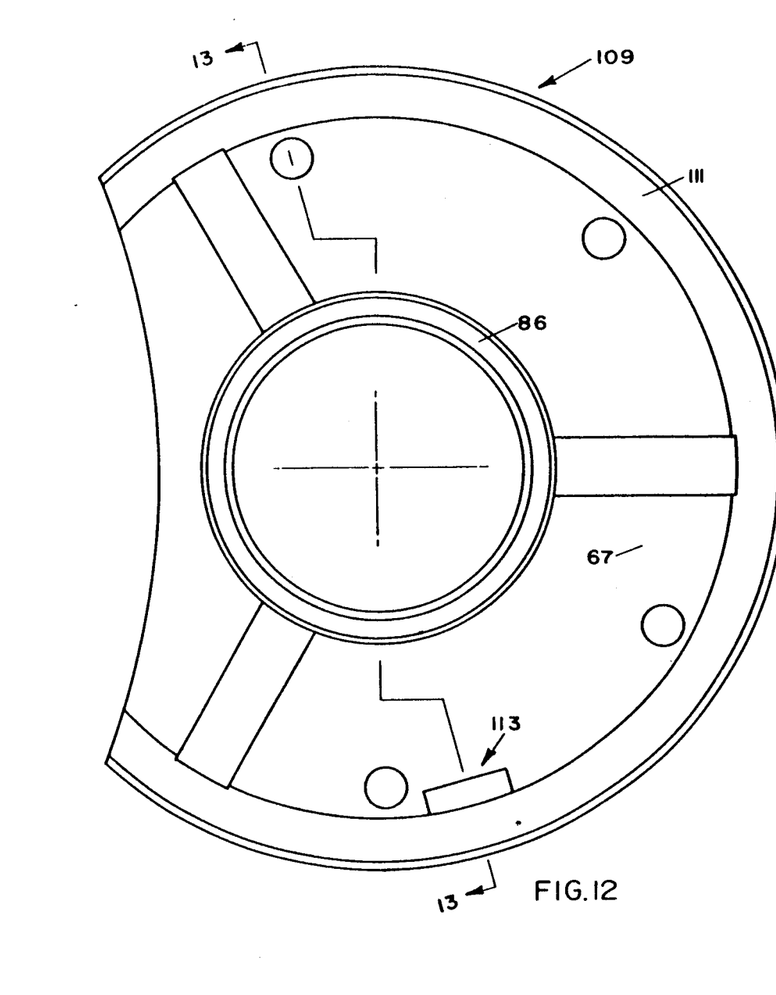
FIG. 12 is a plan view of still another embodiment of the invention utilizing a lubricant barrier which overhangs the pinion gear.
Figure 13:
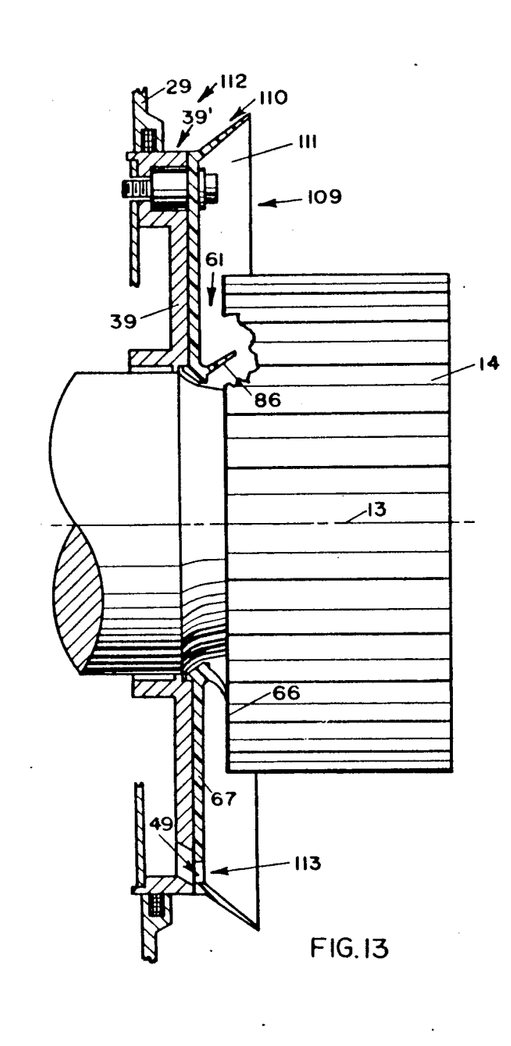
FIG. 13 is a sectional view taken generally along lines 13—13 of FIG. 12 showing the device in a mounted position.

A further alternate embodiment of the invention is shown in FIGS. 12 and 13. This embodiment is somewhat similar to the embodiment shown in FIGS. 4–6 and further incorporates a diverting means or second barrier means 110 extending from the lubricant restricting device 109 and overhanging and at least a portion of the pinion gear 14 (FIG. 13).

The diverting means 110 may include a web or leaf section 111 extending from the base 67 inwardly into the gear case from a point adjacent the mounting plate 39. The web or leaf 111 may be generally arcuately formed in truncated conical form. As shown, the web rediverges radially away or outwardly from the axial centerline 13 of the armature shaft 12. Preferably the web overhangs the pinion 14 for as great an arc as possible so as to reduce the lubricant splash effects "P" and "V" shown in FIG. 2.

In the embodiment shown, the web 111 extends to where it will be in close proximity to the mesh of the pinion 14 and bull gear 15 without touching the latter. Thus the arc may extend in the nature of 275°. The web in effect forms a "V"-shaped trough or channel 112 in combination with the O.D. 39' of the mounting plate 39 and the gear case side 29 in which lubricant may collect or be diverted. Lubricant may thus be diverted away from the space 61 between the pinion 14 and the restricting device 109.

It will also be noted in FIGS. 12 and 13 that the web 111 also extends below and under the drain slot 113 in the base 67 which in turn communicates with the inner drain port 49 in the mounting plate 39. The web thus further shields the drain port from direct lubricant splash V when the bull gear 15 is rotating (FIG. 2) in the direction "R". In the opposite bull gear rotation "S", gear lubricant is thrown over the top of the pinion 14 (as at "P") and collected by the web 111 and diverted from running directly between the pinion gear 14 and the mounting plate 39.

Figures 14, 14A, 14B, 16:
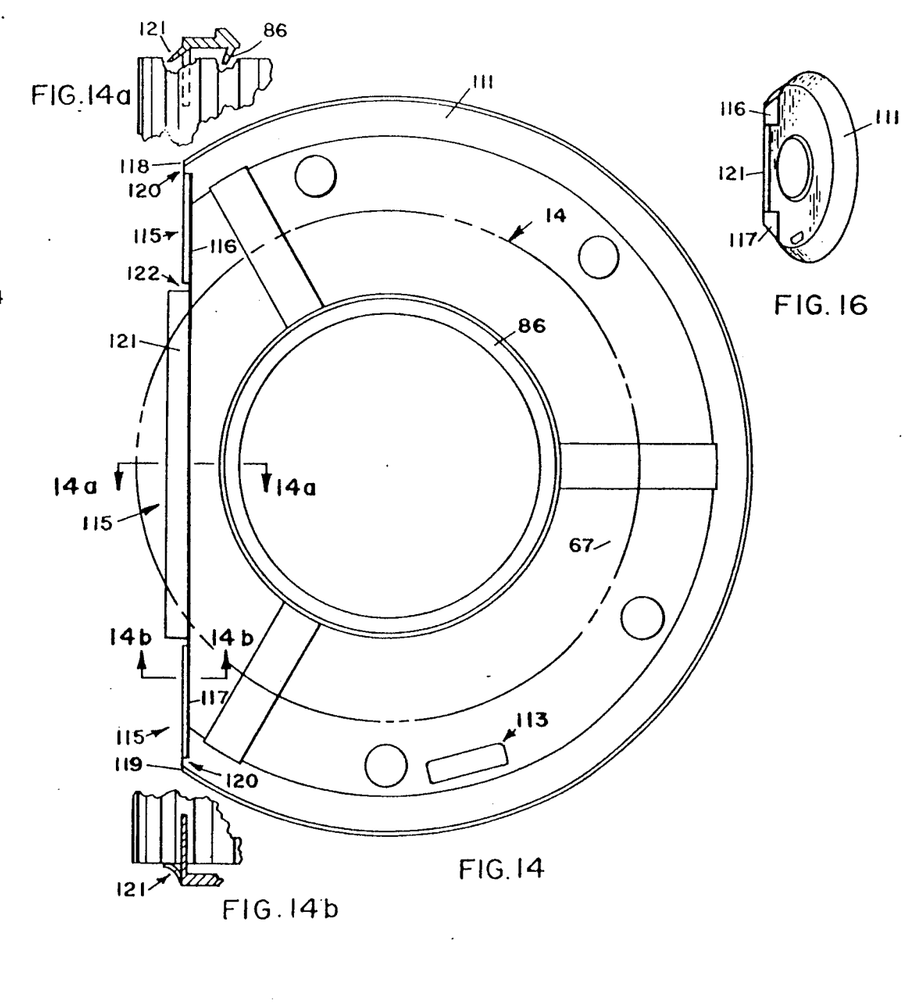
FIG. 14 is a plan view of a further embodiment of the invention showing additional lubricant barrier means which generally extends in a chordal direction relative to the circumference of the pinion gear.
FIG. 14a is a fragmentary sectional view taken along lines 14a—14a of FIG. 14.
FIG. 14b is a fragmentary sectional view taken along lines 14b—14b of FIG. 14.
FIG. 16 is a small perspective view of the embodiment shown in FIGS. 14 and 15.
Figure 15:
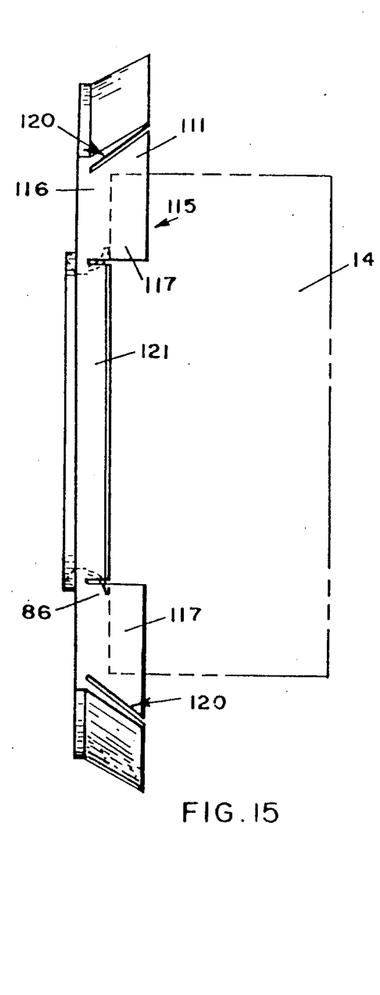
FIG. 15 is a side view of the embodiment shown in FIG. 14.
Figure 17:
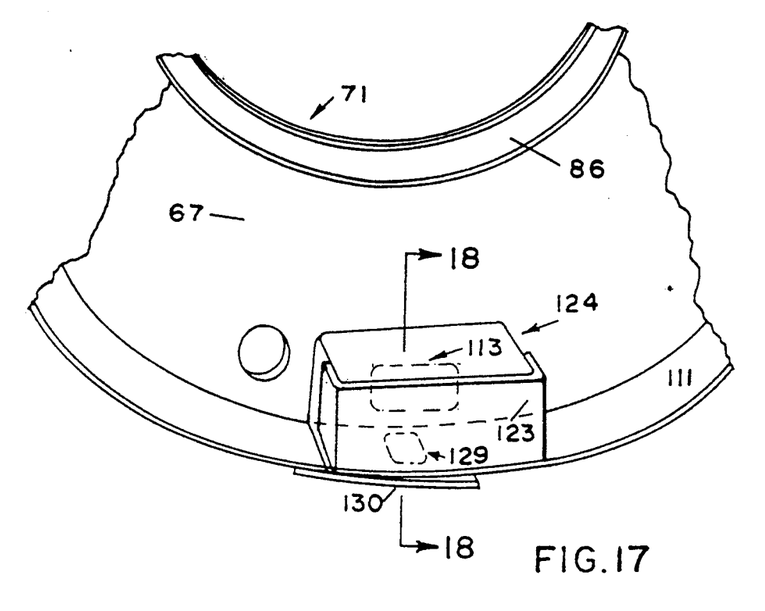
FIG. 17 is a partial perspective view showing another shielding means for the lubricant return or drain port.

As another feature of the invention, to further restrict the flow of lubricant into the space 61 between the pinion gear 14 and the mounting plate 39, there may be provided an additional or third lubricant barrier means in the form of a deflector 115 (FIGS. 14–16). The deflector 115 may project toward the inside the gear case from the base 67 and have a top wing 116 and a bottom wing 117 which straddle and overhang pinion gear 14 adjacent its meshing area with bull gear 15. In other words, the deflector wings 116 and 117 project inwardly toward the interior of the case and overhang the pinion gear so as not to touch its teeth.

In the embodiment shown, the deflector wing 116 extends in a chordal direction relative to the circumference of pinion 14, i.e. from a point 118 adjacent the top termination of the web 111. Bottom wing 117 in similar manner extends from adjacent the lower termination 119 of the web 111.

As shown in FIG. 15, the deflector wings 116 and 117 may project inwardly or overhang the pinion gear 14 approximately the same distance as the web 111. To accommodate chunks of hard gear lubricant which may be present as a result of cold weather shut-down periods, the wings 116 and 117 may be made of a pliant flexible material such as nylon and may be attached to the base 67 while being spaced slightly from the web 111 as at 120 (FIGS. 14–15). This permits a slight flexing or fluttering of the wings relative to the base 67 and web 111.

As an additional barrier to the flow of lubricant between the pinion gear 14 and the mounting plate 39 as indicated at 61 (FIG. 4), the deflector 115 may include a flexible lip 121 which engages the side of pinion 14 and generally extends between the wings 116 and 117 (FIGS. 14 and 15). Preferably lip 121 faces toward the bull gear 15 and is spaced slightly from the wings 116 and 117 as at 122 to permit it to flex independently of the wings. The lip 121 thus engages the side of the pinion 14 in chordal fashion somewhat adjacent the tooth area and the gear teeth will actually brush past the lip. It is therefore desirable that the lip 121 extend slightly beyond the teeth in a chordal direction to reduce any catching tendency on the teeth.

A further embodiment of the invention is shown in FIGS. 17–20, wherein additional shielding means for the mounting plate drain port 49 are shown. In this embodiment, a housing or cover 124 surrounds the drain opening 113 in the base 67 and may extend outwardly from the base generally as far as the web 111. Housing 124 may include side walls 125, a top wall 126, a bottom wall 127 (may be formed by a section of the web 111), a back wall 128 formed by a portion of the base 67 and a front wall 123. In some instances it might be desirable to extend the housing 124 a greater distance under the pinion gear to enable it to move farther away from the gear lubricant concentration which gathers adjacent the gear case side walls 28–33, etc.

A means for draining the lubricant from the housing is provided by an aperture 129 in the bottom wall 127. To prevent lubricant splash V (FIG. 2) from bull gear 15 from being directed through aperture 129 (particularly when it is moving the direction R), there may be provided a first moveable flap 130 which covers the aperture. Flap 130 is preferably hinged as at 131 (FIG. 19) on the side of the aperture 129 toward the bull gear 15 so lubricant flow in the direction V will tend to slide past the flap and provide a lifting or closing action. In other words, the flap 13 is, in effect, held in tight sealing engagement with the underside of web 111 along its hinge area 131.

Figure 19:
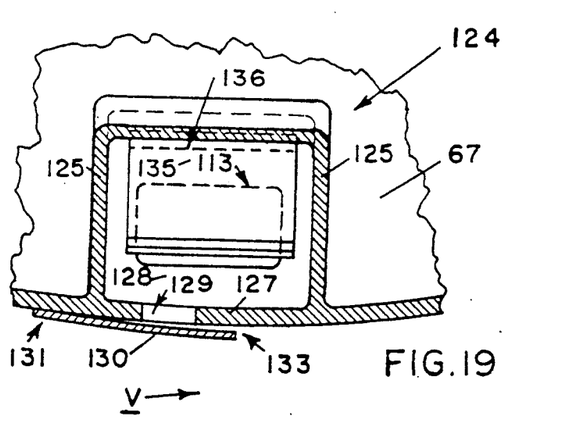
FIG. 19 is a sectional view taken along lines 19—19 of FIG. 18.
Figure 20:
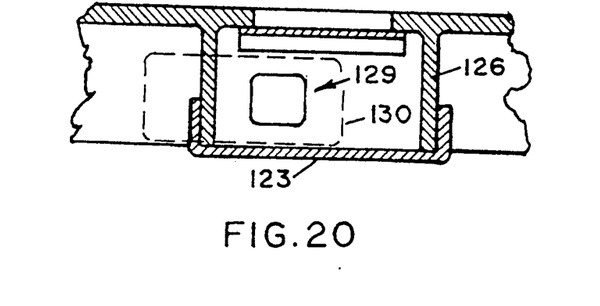
FIG. 20 is a sectional view taken along lines 20—20 of FIG. 18.

As shown in FIG. 19, bottom flap 130 normally hangs open slightly with a slight gap as at 133 to provide drainage. Even with lubricant low in the direction V, the flap 130 may be made to provide a slight gap for drainage of lubricant returning via the mounting plate port 49 (FIG. 4) into the housing 124. However, direct flow or splash of lubricant into the aperture 129 is eliminated since the flap 130 is larger than the aperture 129 and thus extends beyond the aperture.

To provide further restriction to lubricant splash which may pass the bottom or first flap 130, an upper or second moveable flap 135 may be used to cover the drain opening 113 in housing back wall 128. Flap 135 may be somewhat vertically disposed and hinged adjacent its top as indicated by dotted lines at 136 to enable it to move outwardly from the back wall 128 toward the front wall 123. Any lubricant sputtering or splash entering through the housing aperture 129 and hitting the front of the flap 135 will have a tendency to cause the flap to seat against the back wall 128. A flange 137 (FIG. 18) may be formed to flare outwardly from the flap 135 along its lower edge to provide a small gap 138 for some drainage while heavier drainage will cause the flap 135 to spring away from the drain opening 113.

Flaps 130 and 135 thus, in effect, serve as valve means to eliminate or limit flow in one direction while permitting greater flow in the opposite direction. This is particularly helpful for rotation of bull gear 15 in direction "R", where the gear in addition to splashing lubricant has been found to act like a fan and produce a positive air pressure effect toward the drain port 49 (FIG. 4) resulting in air flow carrying lubricant through the drain port 49.

Figure 18:
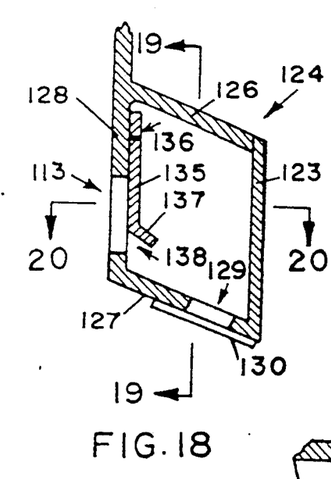
FIG. 18 is a sectional view taken along lines 18—18 of FIG. 17.

As will be apparent in FIG. 18, the bottom aperture 129 is offset away from the housing back wall 128 (and the flange 137 of the upper flap) so any splatter passing through the bottom aperture 129 will not be directly in line with the gap 138.

While the various lubricant barrier means are shown to be incorporated as with the lubricant restricting device 65 and 85 etc. of the invention, it will be apparent that the concepts of the invention might also be incorporated as part of the mounting plate 39 or as part of the gear case. Moreover, although the invention has been described in terms of certain specific embodiments, it is to be understood that other forms may be adopted within the scope of the invention as defined in the appended claims.

What we claim is:

1. A lubricant restricting device for use with a bearing mounting assembly including a mounting plate having a face with a shaft opening therein through which a rotatable shaft having a smaller diameter than said opening extends, wherein said shaft has a first gear mounted on an end thereof with said first gear being spaced axially outwardly from said mounting plate face with a side of said gear toward said face, said first gear being in interacting engagement with a second gear, said gears and said mounting plate face being positioned within a gear case having lubricant therein, said gears when interacting with one another and said lubricant giving off a lubricant flow pattern within said case, and wherein said mounting plate face has an inner drain port therein through which lubricant which passes through said shaft opening in said mounting plate face may be returned to said case and also an outer drain port through which excess lubricant may pass, said device comprising, a base for nesting against said mounting plate, said base having a shaft opening therein which registers with said shaft opening in said mounting plate and through which said shaft extends, said base having means for shielding at least a portion of said inner drain port from lubricant in said gear case while allowing lubricant drainage from said inner drain port to be returned to said case, and means attached to said base and spaced away from said gear and out of contact therewith to act as a further restriction to lubricant flow past said mounting plate, said means for shielding said inner drain port including a drain slot in said base communicating with said inner drain port and cover means extending away from said base in overhanging relation with respect to said drain slot in said base, and wherein said means attached to said base and spaced away from and out of contact with said base includes a web which meets said cover means and overhangs at least a portion of said gear, said cover means including an aperture therein through which lubricant may pass said web and return to said case.

2. A device as claimed in claim 1 wherein said cover means has a front wall facing said gear.

3. A device as claimed in claim 1 wherein an aperture is provided in said cover means for discharging lubricant which may enter said cover means.

4. A device as claimed in claim 3 wherein said drain slot in said base and said aperture in said cover means are offset with respect to one another.

5. A device as claimed in claim 3 wherein means are provided for protecting said aperture.

6. A device as claimed in claim 3 wherein a moveable member is provided for protecting said aperture.

7. A lubricant restricting device for use with a bearing mounting assembly having a mounting plate with a shaft opening therein through which a rotatable shaft is adapted to extend, wherein said shaft has a gear mounted on the end thereof with said gear being spaced outwardly from said mounting plate with a side of said gear facing said mounting plate, said gear being positioned within a gear case having lubricant therein, and wherein said mounting plate is exposed to the inside of said gear case and also has an inner drain port therein through which lubricant which passes from said gear case through said shaft opening may return to said gear case, said device comprising, a base adapted to be secured to said mounting plate, a first barrier means supported by said base extending toward said gear to reduce lubricant flow toward said shaft between said mounting plate and said gear, a second barrier means supported by said base extending in the direction of said gear and disposed farther away from said shaft than said first barrier means and acting to reduce lubricant flow toward said first barrier means, shielding means positioned adjacent said inner drain port to protect said port from lubricant flow in said gear case which is directed toward said port, and deflector means overhanging a portion of said gear for further reducing lubricant flow between said gear and said mounting plate.

8. A device as claimed in claim 7 wherein said deflector means extends in a chordal direction relative to the circumference of said gear.

9. A device as claimed in claim 8 wherein said deflector means may flex.

10. A lubricant restricting device for use with a bearing mounting assembly having a mounting plate with a shaft opening therein through which a rotatable shaft is adapted to extend, wherein said shaft has a gear mounted on the end thereof with said gear being spaced outwardly from said mounting plate with a side of said gear facing said mounting plate, said gear being positioned within a gear case having lubricant therein, and wherein said mounting plate is exposed to the inside of said gear case and also has an inner drain port therein through which lubricant which passes from said gear case through said shaft opening may return to said gear case, said device comprising, a base adapted to be secured to said mounting plate, a first barrier means supported by said base extending toward said gear to reduce lubricant flow toward said shaft between said mounting plate and said gear, a second barrier means supported by said base extending in the direction of said gear and disposed farther away from said shaft than said first barrier means and acting to reduce lubricant flow toward said first barrier means, shielding means positioned adjacent said inner drain port to protect said port from lubricant flow in said gear case which is directed toward said port, and means for further reducing lubricant flow between said gear and said bearing mounting assembly which includes a lip extending in a chordal direction relative to the circumference of said gear and adapted to engage a side of said gear.

* * * * *